United States Patent [19]

Cheng et al.

[11] Patent Number: 5,235,592
[45] Date of Patent: Aug. 10, 1993

[54] DYNAMIC SWITCH PROTOCOLS ON A SHARED MEDIUM NETWORK

[75] Inventors: Ting D. Cheng, Mahopac; Peter A. Franaszek, Katonah; Christos J. Georgiou, White Plains, all of N.Y.; Gregory M. Nordstrom, Oronoco, Minn.; Thomas K. Philips, Hopewell Junction, N.Y.; Martin W. Sachs, Westport, Conn.; Anujan M. Varma, Santa Cruz, Calif.; Thomas M. Walker, Rochester, Minn.

[73] Assignee: International Business Machines Corporation, Armonk, N.Y.

[21] Appl. No.: 744,153

[22] Filed: Aug. 13, 1991

[51] Int. Cl.$^5$ .............................. H04J 3/02

[52] U.S. Cl. ............................ 370/85.4; 370/60; 370/60.1; 370/85.13; 370/94.1

[58] Field of Search ............ 370/53, 58.1, 58.2, 370/58.3, 60, 60.1, 82, 83, 85.2, 85.3, 85.4, 85.5, 85.6, 85.12, 94.1, 99, 110.1; 340/825.06, 825.5, 825.51, 825.52, 825.79, 825.8; 379/271, 272

[56] References Cited

U.S. PATENT DOCUMENTS

| | | | |
|---|---|---|---|
| 4,074,142 | 2/1978 | Jackson | 250/551 |
| 4,191,941 | 3/1980 | Springer et al. | 340/825.79 |
| 4,562,533 | 12/1985 | Hodel et al. | 364/200 |
| 4,590,468 | 5/1986 | Stieglitz | 370/85.4 |
| 4,605,928 | 8/1986 | Georgiou | 340/825.94 |
| 4,621,359 | 11/1986 | McMillen | 370/60 |
| 4,630,045 | 12/1986 | Georgiou | 340/825.79 |
| 4,631,534 | 12/1986 | Franklin et al. | 340/825.5 |
| 4,635,250 | 1/1987 | Georgiou | 340/825.79 |
| 4,641,302 | 2/1987 | Miller | 370/60 |
| 4,692,917 | 9/1987 | Fujioka | 370/60 |
| 4,700,184 | 10/1987 | Noirel et al. | 340/825.5 |
| 4,700,185 | 10/1987 | Balph et al. | 370/85.13 |
| 4,701,756 | 10/1987 | Burr | 370/60 |
| 4,703,477 | 10/1987 | Adelmann et al. | 370/94.1 |
| 4,703,478 | 10/1987 | Haselton et al. | 370/94.1 |
| 4,726,018 | 2/1988 | Bux et al. | 370/85.6 |
| 4,755,986 | 7/1988 | Hirata | 370/60 |
| 4,771,419 | 9/1988 | Graves et al. | 370/60 |
| 4,794,520 | 12/1988 | Kobus, Jr. et al. | 364/200 |
| 4,797,881 | 1/1989 | Ben-Artzi | 370/85.4 |
| 4,845,706 | 7/1989 | Franaszek | 370/62 |
| 4,849,969 | 7/1989 | Annamalai | 370/100.1 |
| 4,860,250 | 8/1989 | Gurd et al. | 370/94.1 |
| 4,868,742 | 9/1989 | Gant et al. | 364/200 |
| 4,872,162 | 10/1989 | Tanaka et al. | 370/94.1 |
| 4,885,744 | 12/1989 | Lespagnol et al. | 370/94.1 |
| 4,893,303 | 1/1990 | Nakamura | 370/60 |
| 4,893,304 | 1/1990 | Giacopelli et al. | 370/60 |
| 4,910,507 | 3/1990 | Shimizu et al. | 340/825.5 |
| 4,920,484 | 4/1990 | Ranade | 370/60 |
| 4,926,415 | 5/1990 | Tawara et al. | 370/60 |
| 4,926,420 | 5/1990 | Shimizu | 370/94.1 |
| 4,929,939 | 5/1990 | Varma et al. | 379/272 |
| 4,930,121 | 5/1990 | Shiobara | 370/85.4 |
| 5,048,062 | 9/1991 | Gregg et al. | 370/105.4 |
| 5,107,489 | 4/1992 | Brown et al. | 370/58.2 |

OTHER PUBLICATIONS

IEEE Standards for Local Area Networks: Token-Passing Bus Access Method and Physical Layer Specifications, 802.4, 1985.
IBM Technical Disclosure Bulletin, "Parallel Interface Switching Mechanism," vol. 27, No. 8, Jan. 1985.

Primary Examiner—Douglas W. Olms
Assistant Examiner—Alpus H. Hsu
Attorney, Agent, or Firm—Scully, Scott, Murphy & Presser

[57] ABSTRACT

Dynamic switch protocols are implemented on a token bus protocol in a shared medium network to improve the basic token bus functional capabilities and link utilization, and to produce a uniform transaction protocol that supports both token bus and dynamic switch networks. Frame formats common to both token bus and dynamic switch protocols are utilized, and circuit switched protocols are superimposed on a token bus protocol in interlocked and data transmissions to establish a circuit switched path between a token holder sender node and a destination node. An initial frame transmission uses a normal link header and establishes the circuit switched path between the sender node and the destination node. Subsequent data frames contain no link header information, thereby improving transmission efficiency, and the last frame in such a transmission disconnects the switched circuit path, thereby allowing other transmissions to resume. The use of circuit switched protocols within a token bus protocol allows more general transmission sequences and improves the utilization of token bus bandwidth.

12 Claims, 5 Drawing Sheets

DYNAMIC SWITCH PROTOCOLS ON A SHARED MEDIUM NETWORK

BACKGROUND OF THE INVENTION

1. Field of the Invention

The present invention relates generally to the implementation of dynamic switch protocols on a shared medium network. More particularly, the present invention superimposes dynamic switch protocols on a token bus protocol to improve the basic token bus functional capabilities and link utilization, and to produce a uniform transaction protocol that supports both token bus and dynamic switch networks.

2. Discussion of the Prior Art

A token bus is well known in the prior art, and is characterized by a physical broadcast medium in which all nodes receive every transmission and in which only one node may transmit at any time. Token buses may be applied to classical electrical bus structures, radio transmissions, and in the case of fiber optical media, to passive star optical couplers.

Transmissions on a token bus are structured as frames which are addressable to the various other nodes on the token bus. Ordinarily, in a token bus architecture, a single token is circulated among all the nodes on the bus to control access to the bus medium; that is, at any time only one node on the bus will hold the token and thereby own the bus medium for transmission purposes. When a node completes its transmissions, it transmits the token to the next node in the token circulation policy. Typically, the token circulates to each node on the bus once in a cycle, forming a logical access ring.

IEEE 802.4 is a token bus architecture that has been approved as an industry standard by the American National Standards Institute (ANSI) since December 1984, and reference can be made to the fourth edition of the IEEE 802.4 architecture specification, published in June of 1988 by the IEEE.

The IEEE 802.4 architecture describes a basic token-passing media access protocol for a shared physical bus medium. In one embodiment, the present invention superimposes dynamic switch protocols on the IEEE 802.4 token bus protocol to enhance the efficiency of that protocol.

The IEEE 802.4 token bus standard is representative of token bus architecture, and defines protocols to initialize the logical ring, exchange the token, and recover the token if the token is lost. All transmissions within IEEE 802.4 are fully encapsulated frames with complete link headers. The IEEE standard defines two frame transmission protocols: non-interlocked and request-with-response. Non-interlocked frame transmissions are simple single frame transmissions to an arbitrary destination. Request-with-response transmissions allow a single frame transmission to a destination that then implicitly acquires the sender's token rights to provide a single frame response to the sender's request frame. Upon completion of the destination's response frame transmission, the original requester resumes its token rights. In both the non-interlocked and request-with-response protocols, the frame transmissions carry a complete link header with control and destination addressing information.

The present invention alleviates a major source of inefficiency associated with the above transmission protocols: Attaching a complete link header to every transmitted frame results in unnecessary overhead when a large block of data is transmitted as a sequence of smaller frames. Such transmissions are necessary because of buffer-space limitations in the stations and also to achieve better error-coverage. For example, with 256-byte data frames and 32-byte headers, the overhead introduced is approximately 12.5 percent of the total transmission. The transmission protocols implemented by the present invention reduce this overhead by allowing a virtual circuit to be established between two link servers.

The token-bus is a blocking medium, and therefore allows only one transmission to proceed in the network at any time. The performance of the network can be improved by the substitution of a non-blocking switch in place of a passive coupler without affecting the topology of the network. The use of a non-blocking switch affords higher throughput and enhanced functional capabilities. Although IEEE 802.4 transmission protocols can be applied to a switched-star network which utilizes a non-blocking switch, the resulting implementation is relatively inefficient, and does not effectively utilize the additional functional capabilities of the non-blocking switch. It is desirable to define uniform transmission protocols for these two network-types, the switched-star and the passive-star, so that one type can be substituted for the other without the need to alter the frame formats; this allows the use of identical frame-formatting and recognition hardware to be used in both cases, greatly facilitating a common link-server design. Such inter-operability is a prime motivating factor behind the present invention.

SUMMARY OF THE INVENTION

Accordingly, it is a primary object of the present invention to provide for dynamic switch protocols on a shared medium network.

A further object of the subject invention is the provision of superimposed dynamic switch protocols on a token bus protocol to improve the basic token bus functional capabilities and link utilization, and to produce a uniform transaction protocol that supports both token bus and dynamic switch networks.

The present invention superimposes dynamic switch protocols on a token bus protocol to improve the basic token bus functional capabilities and link utilization, and to produce a uniform transaction protocol that supports both token bus and dynamic switch networks. The characteristics of this invention that produce these enhancements include:

1. Frame formats are common for both token bus and dynamic switch protocols. Frame transmissions use switch controls typical of dynamic switch protocols and mimic dynamic switch protocols within the token bus protocol itself.

2. Interlocked and data transmissions use circuit switched protocols superimposed on the token bus protocol to establish virtual circuits between a token holder sender node and a destination node. The initial frame transmission uses a normal link header, and establishes a "circuit switched" path between the sender and destination. Subsequent frames contain no link header information, thereby improving transmission efficiency. The last frame in such a transmission disconnects the virtual circuit, allowing other transmissions to resume.

3. Non-interlocked frame transmissions occur as packet switched frames, to distinguish these from frame transmissions that use circuit switched protocols and to maintain compatibility with the basic IEEE 802.4 frame non-interlocked request transmission protocol.

In general, the use of circuit switched protocols within a token bus protocol allows more general transmission sequences and improves the utilization of token bus bandwidth, while packet switched protocols maintain compatibility with basic token bus protocols. More specifically, the advantages of this invention are:

1. Virtual circuit paths on a token bus eliminate the need for link header information in transmissions of related frames and improve the throughput of the token bus protocols. For example, a circuit switched path on a token bus can improve the link utilization during data transfer by roughly 10%–20% when the link header is 48-bytes and each data frame is 512 or 256 bytes in length.

2. The present invention, through the use of circuit-switched transmissions, is particularly useful in cascading or bridging token buses. Circuit-switched paths can be applied to synchronize independently circulating tokens on separate token buses and form a complete path between two nodes on different cascaded buses, thereby simplifying the protocols need to support cascaded or bridged buses. Circuit-switched paths also preserve the transmission order of a stream of related frames transmitted through a network of token buses that are cascaded by means of bridge or switch elements therebetween.

In contrast thereto, the IEEE 802.4 token bus definition does not itself provide for bridged or cascaded buses, and its protocols define only singular, discrete frame transmissions so that the protocol itself does not preserve the logical relationship of a sequence of frames. Thus, if multiple paths exist between two nodes in a network of cascaded token buses, the transmission order of a sequence of frames may not be preserved through that network.

3. Logical circuit paths on the token bus broaden the interlocked transmission capabilities of the token bus beyond that allowed with the simple IEEE 802.4 request-with-response protocol. More complex transactions can be performed using circuit switched logical paths, thereby improving the functional capabilities of the token bus architecture.

4. The use of packet-switched transmissions preserves compatibility with the basic token bus discrete frame transmission protocols while extending the protocols to include circuit switched capabilities with no differences in frame structure.

5. The subject invention unifies dynamic switch and token bus protocols for normal link level transmissions, and thereby allows common frame formats, common recognition logic, and common logic for normal transmission protocols. This simplifies the migration of the link interface logic from the token bus physical connection medium to a dynamic switch medium.

The present invention departs in a nonobvious manner from the prior art in that dynamic switch and token bus media access protocols have been treated traditionally as separate and distinct network protocols which require radically different implementations. The present invention teaches that these protocols can be unified for normal frame transmissions to enhance the token bus protocol and simplify the migration of network interfaces from a token bus medium to a non-blocking dynamic switch medium.

The present invention is particularly useful and advantageous in that both switched and token bus protocols are implemented in present computer communications products, and future trends in computer communications are likely to increase the importance of the subject invention. In particular, optical star couplers are an attractive medium for forming inexpensive bus and star network structures with fiber optical components, and the token bus is an efficient access method for controlling node access in such structures.

The present invention enhances the functional and performance capabilities of the IEEE 802.4 token bus standard, and thereby improves the usefulness of the standard itself and the associated physical interconnect media (such as passive optical star couplers) for which this standard was defined. Additionally, the ability to increase performance from a less-costly token bus physical medium to a non-blocking dynamic switch medium, with minimal impact to the token bus interface facilities, optimizes the utilization of the token bus.

BRIEF DESCRIPTION OF THE DRAWINGS

The foregoing objects and advantages of the present invention for dynamic switch protocols on a shared medium network may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

In one advantageous embodiment, the present invention is applicable to a network of stations interconnected through a passive broadcast medium, such as an optical star-coupler network. U.S. patent application Ser. No. 07/679,874, filed Apr. 3, 1991, for PROTOCOL FOR HYBRID LOCAL AREA NETWORKS, which is expressly incorporated-by-reference herein, discloses a local area network for interconnecting multiple stations having a non-blocking switch, as can be utilized with the present invention. Each station contains one or more link servers which form the interface of the station to the network. Each link server can be connected to the network by a pair of fiber links. The link server is the basic addressable entity in the network. The medium-access protocol employed is the token bus, where the transmission rights of stations are controlled by a token circulated among the stations. A link server with data to transmit waits until it receives the token; the link server then transmits the data and finally transmits the token to the next link server in the sequence. Thus, the link servers in the network form a logical ring as determined by the token-circulation sequence.

Frame Structure

Figure 1:
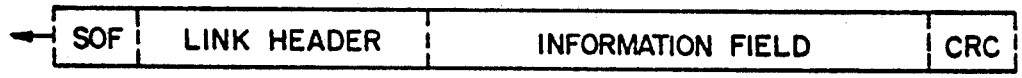
FIG. 1 illustrates a general frame structure pursuant to the present invention which begins with a start-of-frame (SOF) delimiter, followed by a link header containing the source and destination addresses and also information useful for interpreting the contents of the frame, followed by the information field of the frame which can vary in length, and ending with a cyclic-redundancy-code (CRC) word.

Pursuant to the present invention, all transmissions on the network are organized as frames. Referring to FIG. 1, each frame begins with a special start-of-frame (SOF) delimiter that is then followed by a link header containing the source and destination addresses, as well as information useful for interpreting the contents of the frame. The information field of the frame follows the link header, and the frame ends with a cyclic-redundancy-code (CRC) word. The information field within the frame can vary in length. Using this format on the token bus, the link header can be omitted from certain types of frame transmissions, and in such frames the information field directly follows the SOF delimiter. The general frame-structure is illustrated in FIG. 1.

The SOF delimiter, in addition to indicating the start of the frame, also serves to convey control information for path-setup. For example, the first frame in a sequence of frames addressed to the same destination can be provided with a special connect SOF delimiter, indicating that a path needs to be set up for the succeeding frames to follow. This path can be a physical or logical circuit. The last frame in the sequence terminates this path by a special disconnect SOF delimiter. Such circuit-switched operation has a number of advantages:

1. It allows the elimination of the link-header part in all but the first frame in a sequence of frames transmitted to the same destination.

2. In networks composed of cascaded passive-star subnetworks and switches, multiple paths may exist between two link servers. The use of circuit-switched operation allows a sequence of frames to be received at a destination in the same order as they were transmitted. Conversely, in packet-switched or discrete frame transmissions, the packets can arrive out of order if the network does not recognize the relationship between the frames and routes them on multiple paths.

3. When a passive star network is modified to incorporate therein a non-blocking switch, the circuit-switched operation allows an entire sequence of frames to be received at the destination without any intervening frames from other stations.

The following set of distinct SOF delimiters are useful in the present invention to distinguish various frame types. This set can be enhanced in different embodiments to provide additional functionality beyond the elementary features disclosed herein.

1. Connect SOF (CSOF)

This delimiter is used to mark the first frame of a sequence of frames transmitted to the same destination. The connect SOF delimiter causes a dynamic switch to form a circuit-switched path between the originator and the destination endpoint of the frame. When used on a token bus, this delimiter creates a logical circuit-switched path, in which only the destination node addressed in the connect frame processes subsequent frames; all other nodes ignore these frames except to remain in bit synchronization with the transmitting node and to detect the disconnect SOF delimiter.

2. Passive SOF (PSOF)

This delimiter is used in all the intermediate frames of a sequence of frames transmitted on a circuit-switched path. This delimiter causes a dynamic switch to pass the associated frame on the circuit-switched path set up by the first frame of the sequence. On both a switched network and a token bus, node addressing or frame control information is not necessarily required on such frames, and this allows the elimination of the frame header from a related stream of frames, such as a stream of data frames.

3. Disconnect SOF (DSOF)

This delimiter is used to mark the last frame of a sequence of frames transmitted to the same destination. The disconnect SOF delimiter causes a dynamic switch to transmit the associated frame and then disconnect a switched path established by the prior connect SOF. When used on a token bus, the disconnect SOF delimiter terminates the logical circuit-switched path and causes all nodes on the bus to resume interpretation of subsequent frame transmissions.

4. Connect and Disconnect SOF (CDSOF)

This delimiter is used to mark a single-frame message. It causes a dynamic switch to establish a temporary path "packet switch circuit" from the originator to the destination for the purpose of that frame transmission only. The switch path is disconnected with the completion of the associated frame transmission. On a token bus, this delimiter is the default SOF delimiter for all token bus frames which do not rely on circuit-switched paths and protocols, and thus provides compatibility with basic token bus frame transmissions as defined in IEEE 802.4.

Frame Classes

The frames transmitted by the present invention are of two basic classes: message frames and data frames. A message frame specifies an operation to be performed, such as a read, write or control operation. Data frames carry the data associated with a read or write operation and are associated with some preceding message frame.

A message frame may start with any of the four types of delimiters mentioned hereinabove, and depending upon the type of delimiter (see FIG. 2, A or B), can have a link header following the SOF word. The link header includes source and destination addresses, a sequence number to identify the frame, as well as other information specific to the type of message. The sequence number facilitates recovery of lost frames. FIG. 2 shows the basic frame structures for message and data transmissions.

A message frame can be interlocked or non-interlocked. In the case of an interlocked message frame on a token bus, the transmitting link-server relinquishes control of the medium immediately after transmission of a frame or stream of frames and waits for an acknowledgement or response from the destination, by means of a message frame or stream of frames. When such an acknowledgement is received, the link server that transmitted the original frame resumes control of the medium. Interlocked transmission is indicated by a flag in the link header.

Such interlocked operation is inefficient in a token bus network because of the propagation delay in the medium and the resynchronization delay at the receiving station. Therefore, most message frames are transmitted as non-interlocked frames. The acknowledgement to a non-interlocked message is deferred until the destination of the message gains access to the medium (during the next token-visit in the case of token bus). However, certain transaction types require interlocked transmissions and may even involve several such handshakes, in which case the use of circuit switched protocols can allow very general interlocked transmissions.

Figure 2A:
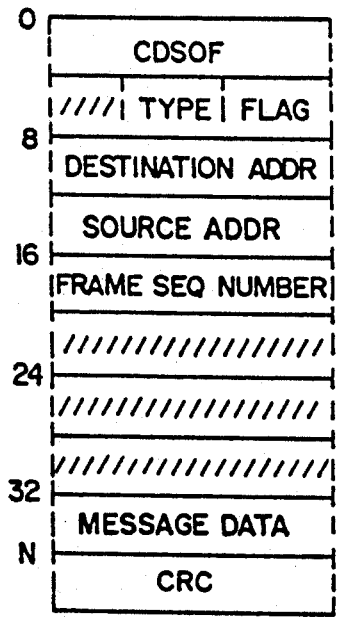
FIG. 2 illustrates the structure of several generic data frame formats, wherein a typical frame length is 512 bytes.
Figure 2B:
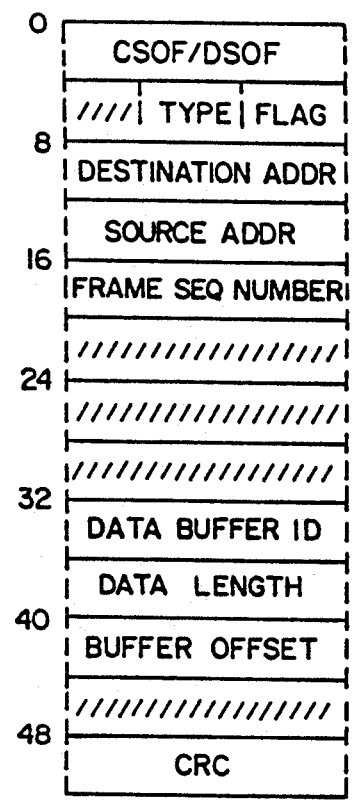
Figure 2C:
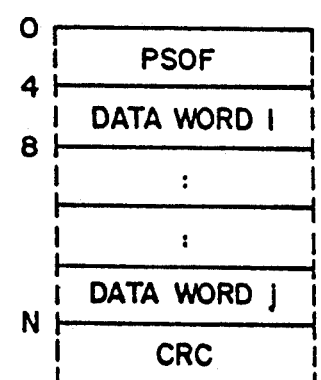

The basic token bus of IEEE 802.4 treats both message and data frames as one generalized data frame type, in which sequential frame transmissions have no definable relationship at the token bus protocol level. In contrast thereto, the subject invention allows a data frame or stream of related (sequential) data frames to be transmitted over a circuit switched path on the token bus, in which case each data frame has a passive SOF delimiter and no link-header following the SOF (FIG. 2C). The data field immediately follows the SOF, and can be variable in length. FIG. 2 illustrates the structure of a data frame, wherein a typical frame length is 512 bytes. FIG. 2A illustrates a typical data frame with a CDSOF delimiter, while FIG. 2B illustrates a typical data frame with a CSOF delimiter, and FIG. 2C illustrates a typical data frame with a PSOF delimiter. A data frame, as it is defined for the purposes of this invention, is normally transmitted as part of a sequence of frames starting with a message frame.

Transmission Protocols

Figure 3A:
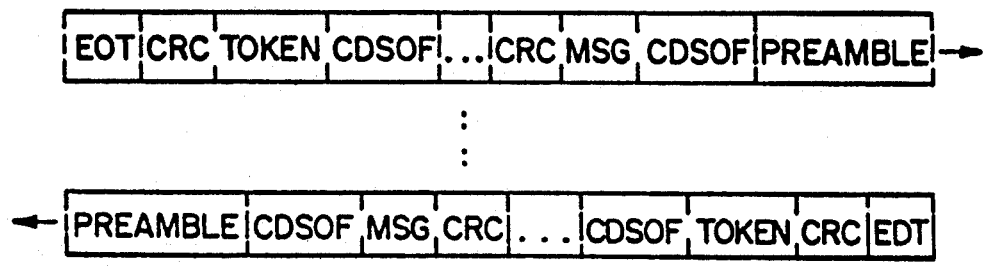
FIG. 3 illustrates several simple message transmission protocols for the network for both non-interlocked message transmissions as in FIG. 3A, also interlocked message transmissions as in FIG. 3B.
Figure 3B:
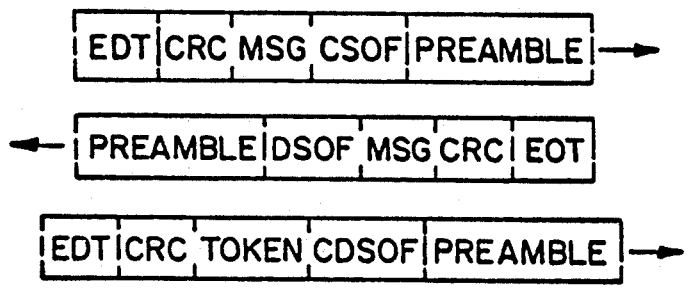

FIG. 3 illustrates message-transmission protocols for the network for both non-interlocked message transmissions as in FIG. 3A, and also interlocked message transmissions as in FIG. 3B. As illustrated in FIG. 3A, each frame passes the token to relinquish control over transmissions on the network, both for the original transmission (top) and the response transmission (bottom). In contrast thereto, in the interlocked transmission of FIG. 3B, the original transmission (top) is sent, a response thereto received (middle), and then the originally transmitting node relinquishes control over transmissions on the network by passing the token (bottom). When a link server receives the token, it always begins its transmission with a preamble to enable the other stations in the network to synchronize their receivers to its transmitter. Message frames may or may not signal an interlocked response, according to a flag in the link-header of the frame. Non-interlocked frames may be followed by additional frames addressed to the same station or different stations and use the connect-and-disconnect SOF delimiter, creating the effect of a packet-switch on the token bus. An interlocked transmission on the token bus begins with a frame carrying a connect SOF delimiter, possibly followed by one or more frames carrying the passive SOF delimiter, and is concluded by an end-of-transmission (EOT) delimiter.

Upon detection of the EOT delimiter, the destination of the frame initiates a response transmission to the sender consisting of a preamble, one or more response message frames (the last with a disconnect SOF delimiter), and a concluding EOT delimiter. The original sender then regains its transmission rights and may resume its transmission with a preamble and additional frames. Minimally, the sending link-server must resume transmission after receipt of the response message to pass the token to the next link-server in the logical ring. In contrast thereto, the IEEE 802.4 token bus request-with-response interlocked protocol allows only one request frame transmission to the destination followed by one response frame transmission from the destination, both of which must carry complete link header information.

Figure 4A:
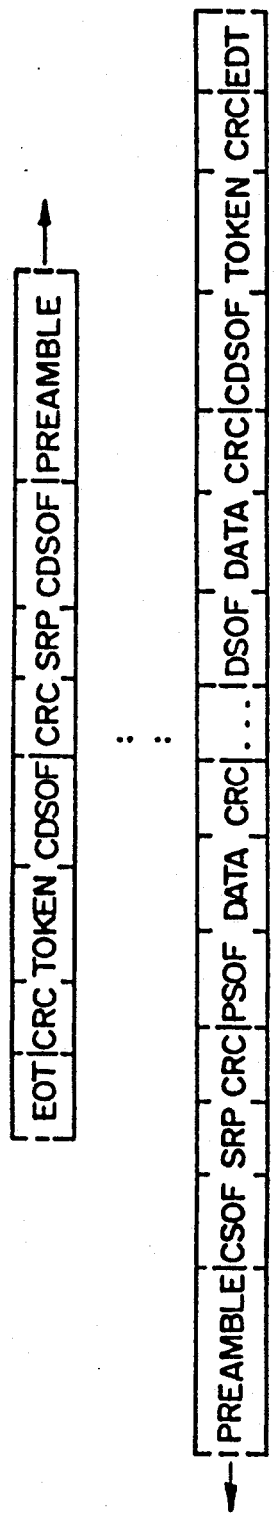
FIG. 4 illustrates several protocols for simple data transmissions, with FIG. 4A illustrating a typical read data transmission protocol and FIG. 4B illustrating a typical write data transmission.
Figure 4B:
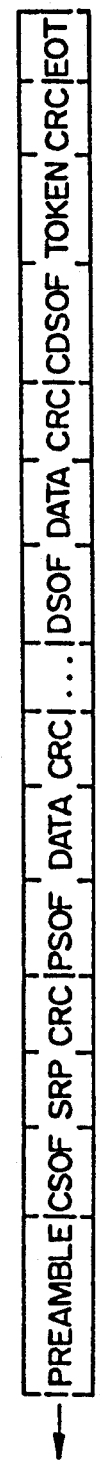
Figure 4B:
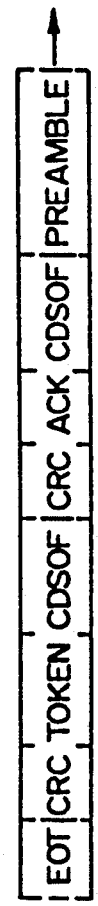

FIG. 4 illustrates protocols for data transmissions, with FIG. 4A illustrating a typical read data transmission protocol and FIG. 4B illustrating a typical write data transmission. Data frames are normally transmitted in association with an SRP (Storage-Request Packet) message-frame and are used when two processes must exchange more data than allowable in a single message-frame. Functions above the link server initiate the use of storage transfer facilities to send data to or to receive data from another link-server.

Separate protocols are defined for read and write operations. In addition, both can be performed in either an interlocked or non-interlocked mode.

A storage-write operation as illustrated in FIG. 4A consists of a write SRP message-frame, followed by one or more data frames. The total amount of data is specified in the SRP. The individual data frames are variable in length, up to an architectural maximum. The SRP contains a connect SOF delimiter as well as addressing parameters for the following data-frames; the data-frames themselves flow on the circuit-switched path set up by the SRP frame and do not contain a link-header. Several data frames may follow the SRP, optionally separated by idle sequences. The last data-frame is normally denoted as such by a disconnect SOF delimiter and other unrelated message-frames may then follow.

A write data sequence as illustrated in FIG. 4B requires an ACK (acknowledge) sequence to confirm successful processing of its data and storage in the destination data-buffer. The ACK may be returned in either non-interlocked or interlocked fashion, which in the latter case means that the last data frame carries a passive SOF delimiter and the ACK response carries the disconnect SOF delimiter that terminates the circuit switched path.

A storage-read operation begins with a read-request SRP from the requesting link-server to the sending link-server. The read-request SRP is normally non-interlocked, and the receiver of the SRP returns the SRP and the data when it acquires the token in the normal token-rotation sequence. In this case, the returned read-request SRP creates a circuit-switched path over which the responding link server sends the data, just as in the case of a storage-write data transfer. Alternatively, the read-request SRP from the originating link server may use the correct SOF delimiter and create the circuit switched path so that the responding link server simply sends the data frames as an interlocked response to the read-request SRP. The last of these data frames carries the disconnect SOF and terminates the circuit switched path.

Figure 5:
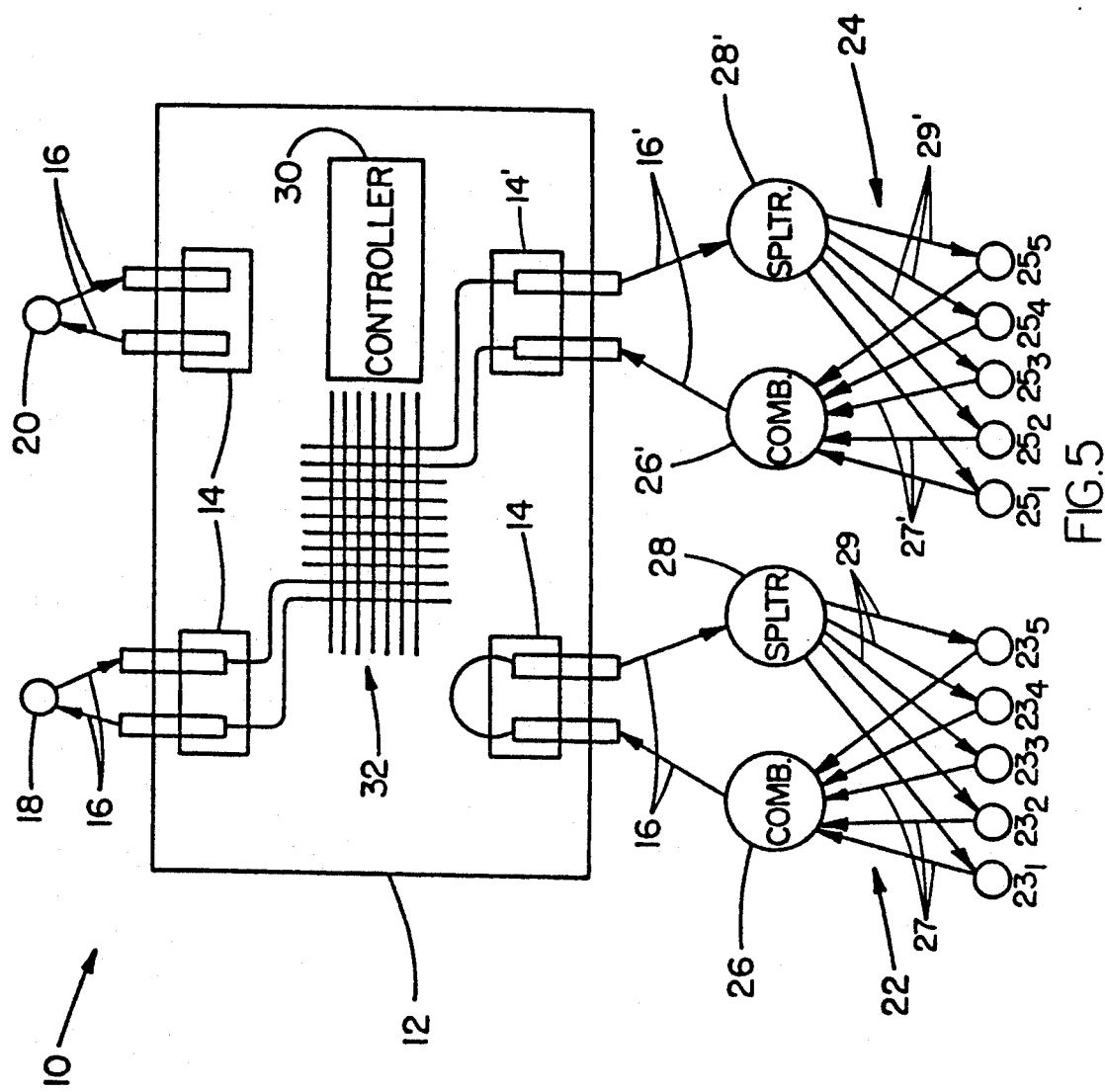
FIG. 5 illustrates an exemplary embodiment of a hybrid LAN which could be utilized to implement the teachings of the present invention.

FIG. 5 illustrates an exemplary embodiment of a hybrid LAN 10 which could be utilized to implement the teachings of the present invention. The LAN 10 consists of an n-port non-blocking switch 12 and multiple subnetworks connected to ports 14, 14' of the LAN via passive optical couplers 26, 26', 28, 28'. Each station in the system is attached via a duplex fiber optic link 16, 16', either directly to a switch port, as in the case of stations 18, 20, or to a subnetwork, as shown at 22, 24, which in turn is attached to a switch pot 14, 14'. Subnetwork 22 serves five different station nodes $23_1$, $23_2$, $23_3$, $23_4$ and $23_5$, while subnetwork 24 serves five different station nodes $25_1$, $25_2$, $25_3$, $25_4$ and $25_5$. A subnetwork is interconnected by means of a passive optical combiner 26, 26' (incoming lines to the switch port from the five connected station nodes) and a passive optical splitter 28, 28' (outgoing lines from switch port to the five connected station nodes). A switch controller 30 sets up connections through the matrix 32 between source and destination ports 14, 14'. A request for setting up a connection can be received at a port 14, 14' from a subnetwork 22, 24, or can be received at a port 14 from a station 18, 20 directly connected to the switch. The controller 30 accesses the switch ports to receive the connection/disconnection requests. In different embodiments, the switch 12 can be a crossbar or time division switch element.

The construction and operation of the optical combiner 26, 26' and the optical splitter 28, 28' are well known in the art. The optical splitter 28, 28' simply splits the optical signal into n parts and directs one split component to each subnetwork station. Each station has a unique address code, and if the incoming address code matches that of the station, the signal is received, and if it does not, the signal is ignored. The optical combiner 26, 26' simply combines all incoming optical signals at the station and passes that signal on. If multiple signals are received at the same time, a collision will occur, which is detected as described in more detail hereinbelow.

Figure 6:
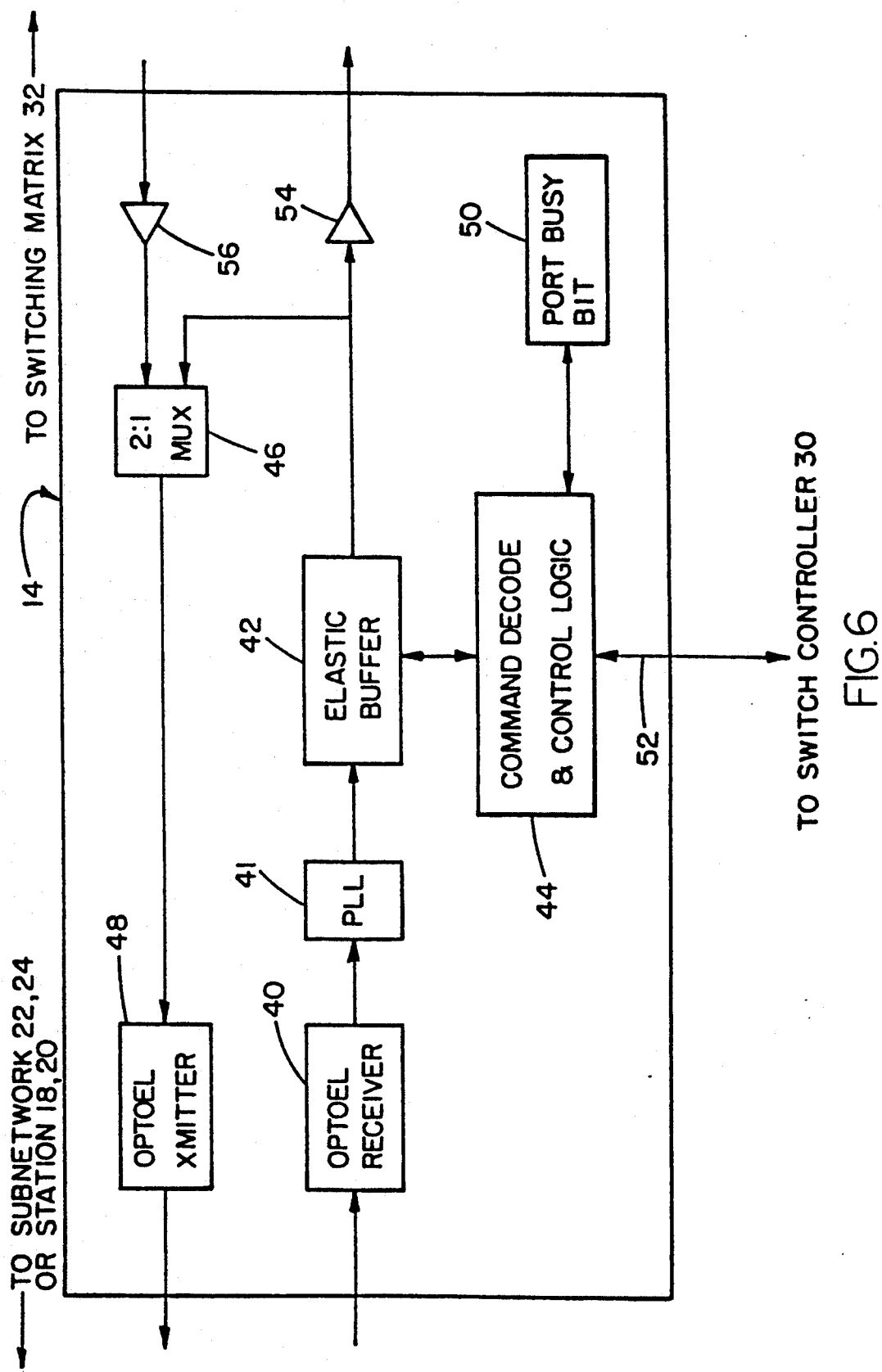
FIG. 6 illustrates an exemplary circuit for one of the switch ports in the hybrid LAN of FIG. 5.

FIG. 6 illustrates an exemplary circuit for one of the switch ports 14, 14'. An incoming optical bit stream is converted to electric pulses at an optoelectronic receiver 40 which are transmitted through a Phase Lock Loop (PLL) 41, and temporarily stored into an elastic buffer 42. A port command decode and control logic 44 determines from the header of the received message whether it is a request for connection, and to which station or port the message is directed. If the message is directed to a station in the same subnetwork, the port control logic 44 controls the 2:1 multiplexer (MUX) 46 to direct the message in the elastic buffer 42 to an optoelectronic transmitter 48 and then back to the subnetwork in a wraparound operation. At the same time, it sets the Port Busy bit or flag 50. At the end of the transmitted message, the Port Busy bit or flag at 50 is reset.

If the data message is directed to another port, the control logic 44 controls the MUX switch 46 to assume a position in which it passes the output from a receiver 56, such that the data message from the elastic buffer 42 is then directed to a data transmitter 54.

The phase lock loop (PLL) circuit 41 synchronizes the frequency of the PLL output signal to the frequency of the bit pulse stream received from the optoelectronic receiver 40, which is usually the frequency of the system clock, but may deviate therefrom by a small $\Delta f$. The PLL circuit also detects a collision between data messages, by losing synchronism when a collision occurs, which is signaled to the command decode and control logic 44, which controls the MUX 46 to forward the colliding pulse trains through optoelectronic transmitter 48 and through optical splitter 28, 28' back to the subnetwork elements which are transmitting. The subnetwork elements themselves then detect the collision, and the newly added transmitter which caused the collision by attempting to transmit over a busy line terminates its attempt to transmit and tries again at a later time.

Collisions can also be detected by the code in the data stream, which should contain only valid characters. If an invalid character is received, it would normally indicate to the receiving station that a collision has occurred between data messages.

While a port is in a local wrap mode, the switch controller 30 may want to connect that port to another switch port. The switch controller will first check the Port Busy bit 50 and abort the request. If a message received at a port is directed to another switch port, the port control logic 44 raises an attention flag at 52 to the matrix controller 30. The controller 30 then accesses the port to receive the destination address and proceeds to determine whether the destination port is not busy. If not, it then makes the connection in the switching matrix 32 and sends a go-ahead signal to the source port to start transmitting the message that has been accumulating in the elastic buffer 44. The delay through the port can be minimal, particularly if it is a local wrap. In cases where the matrix controller 30 is involved, the delay depends on how fast the controller can service the ports. This can be made to be very fast, as for example, by U.S. Pat. No. 4,630,045, C. J. Georgiou, for a Controller for a Cross-Point Switching Matrix. Signals to and from the switching matrix 32 pass through respectively a receiver circuit 56 and a transmitting circuit 54, the constructions of which are well known in the art and normally include a master/slave latching arrangement.

Protocol Description

There are various possibilities for communication:
1. Station-to-station in the same subnetwork 22 or 24;
2. Station in one subnetwork 22 or 24 to station in another subnetwork 24 or 22;
3. Station in a subnetwork 22 or 24 to a directly attached station 18 or 20;
4. Directly attached station 18 or 20 to a station in a subnetwork 22 or 24; and
5. Broadcasting.

The protocol details for the above cases are described in the following paragraphs.

Case 1: Station-to-Station in the Same Subnetwork

This case is handled via a combination of Collision Sense Multiple Access (CSMA) and token passing protocols. A station that wishes to transmit listens for traffic in the subnetwork. When it detects no on-going traffic, it transmits its message with a "connect locally" indication in the header. The Command Decode and Control Logic 44 in the switch port reads the header and wraps the message back into the subnetwork. At the same time, the switch controller 30 updates a port connection table entry for that port to "busy.+ At the end of transmission, a disconnect delimiter is sent. The port breaks the port-wrap and updates the connection table.

If there was a collision because two stations in the same subnetwork initiated transmissions simultaneously, the switch port will be able to detect the collision either by coding errors, or by loss of PLL 41 synchronization. In that case, it will wrap the port around, if it has not already done so, the stations in the subnetwork will also detect the collision and will stop the transmissions. Then, they will establish an order of transmission, by passing a token around in a predetermined sequence. The token passing will last for only one cycle, during which the collided stations will transmit their messages. After the cycle is complete the protocol will become CSMA again.

Case 2: Station in One Subnetwork to a Station in Another Subnetwork

The station transmits a message with the address of the destination switch port in its header. The switch 12 makes the connection to the destination subnetwork. During the time that a connection between the two subnetworks is active in the switch, no other transmissions can be initiated in the subnetworks. This can be established by transmitting idle characters in between frames. The switch connection is broken upon detection of an end-of-frame delimiter. If the destination subnetwork is busy, a reject message is transmitted to the source subnetwork and no connection is established in the switch.

Cases 3, 4 Station in a Subnetwork to a Directly Attached Station (or Vice Versa)

These cases are handled similarly to case 2. Idles are also transmitted in between frames to minimize collisions.

Case 5 Broadcasting

Broadcasting is handled as follows: Any station in the system can issue a broadcast request to the switch 12. The switch receives the request and, if there are no on-going transmissions, sends a "go-ahead" message to the requester. During the broadcast transmission, the switch does not establish any new connections (i.e. it returns "busy" reject frames and disables the port wrap function). If there are ongoing transmissions, the switch places the requester on hold and waits for termination of transmission. Any new requests for connection during this period are also rejected.

The waiting time for the broadcast transmission in the hybrid LAN is no worse than that of any other shared medium LAN (i.e. bus, ring, etc.), because in those LANs the broadcast requester must also wait for the end of an ongoing transmission before starting the broadcast.

While several embodiments and variations of the present invention for dynamic switch protocols on a shared medium network are described in detail herein, it should be apparent that the disclosure and teachings of the present invention will suggest many alternative designs to those skilled in the art.

Having thus described our invention, what we claim as new and desire to secure by Letters Patent is:

1. A method for superimposing a dynamic switch protocol, which establishes a circuit switched path in a shared medium network between a sender node and a destination node, on a token bus protocol as defined in standard IEEE 802.4 as used in a token bus network, in which a token is circulated among all the nodes on the bus to control access to the bus and at any time only one node on the bus holds the token and thereby owns the bus for transmission purposes, to improve the basic token bus functional capabilities and link utilization, and to produce a uniform transaction protocol that supports both token bus and dynamic switch networks, comprising:
   a. utilizing frame formats common to both token bus and dynamic switch protocols; and
   b. superimposing a circuit switched protocol on a token bus protocol as defined in standard IEEE 802.4 in a data transmission to establish a circuit switched path between a token holder sender node and a destination node, including using in an initial frame transmission a link header to establish a circuit switched path between the sender node and the destination node, and omitting a link header in subsequent data frames, thereby improving transmission efficiency, and using a disconnect delimiter in the last frame in said data transmission to disconnect the circuit switched path, thereby allowing other data transmissions to resume, wherein the use of a circuit switched protocol superimposed on a token bus protocol allows more general transmission sequences and improves the utilization of token bus bandwidth.

2. A method of superimposing a dynamic switch protocol on a token bus protocol in a shared medium network as in claim 1, including using packet switched frames in a non-interlocked frame transmission, to distinguish from frame transmissions that use circuit switched protocols, and to maintain compatibility with basic non-interlocked protocol.

3. A method of superimposing a dynamic switch protocol on a token bus protocol in a shared medium network as in claim 1, including using said circuit-switched path between a sender node and a destination node which are on separate cascaded or bridged token buses connected by bridge or switch elements therebetween, and using said circuit switched path to synchronize independently circulating tokens on the separate token buses, and wherein the circuit switched path preserves the transmission order of a stream or related frames transmitted between the sender node and the destination node on the separate token buses.

4. A method of superimposing a dynamic switch protocol on a token bus protocol in a shared medium network as in claim 1, including using the superimposed dynamic switch and token bus protocols in data link level transmissions as defined in standard IEEE 802.4, with common frame formats, common recognition logic, and common logic for transmission protocols, thereby simplifying the migration of link interface logic from a token bus medium to a dynamic switch medium.

5. A method of superimposing a dynamic switch protocol on a token bus protocol in a shared medium network as in claim 1, including using the superimposed dynamic switch and toke bus protocols on a shared medium network which includes optical star couplers with fiber optical components to form bus and star network structures, and controlling node access therein by a token bus protocol.

6. A method of superimposing a dynamic switch protocol on a token bus protocol in a shared medium network as in claim 1, including using a dynamic switch, and using a star network with a non-blocking switch, wherein the circuit-switched operation allows an entire sequence of frames to be received at the destination node without any intervening frames from other nodes.

7. A method of superimposing a dynamic switch protocol on a token bus protocol in a shared medium network as in claim 1, including using a dynamic switch, and using a connect Start of Frame (SOF) delimiter to mark the first frame of a sequence of frames transmitted to the destination node, which causes the dynamic switch to form a circuit-switched path between the sender node and the destination node, and when used on a token bus network, the connect SOF delimiter creates a logical circuit-switched path, and wherein only the destination node processes subsequent intermediate data frames and all other nodes ignore the subsequent intermediate data frames except to remain in bit synchronization with the sender node and to detect a disconnect SOF delimiter in the last frame of the sequence of frames.

8. A method of superimposing a dynamic switch protocol on a token bus protocol in a shared medium network as in claim 7, including using a passive Start of Frame (SOF) delimiter in all intermediate frames of the sequence of frames transmitted over the circuit-switched path, and wherein the passive SOF delimiter causes the dynamic switch to pass each intermediate data frame over the circuit-switched path by the first frame on both a switched network and a token bus, which eliminates a frame header from the intermediate data frames.

9. A method of superimposing a dynamic switch protocol on a token bus protocol in a shared medium network as in claim 1, including using a dynamic switch, and using a connect and disconnect Start of Frame (SOF) delimiter to mark a single frame transmission, which causes the dynamic switch to establish said circuit switched path only for that single frame transmission, and the circuit switched path is disconnected after completion of that single frame transmission, and on a token bus, the connect and disconnect SOF delimiter is a default SOF delimiter for all token bus frames which do not rely on a circuit-switched path protocol, thus providing compatibility with a token bus protocol.

10. A method of superimposing a dynamic switch protocol on a token bus protocol in a shared medium network as in claim 1, including, in a storage write operation, utilizing an initial write storage-request packet message frame followed by one or more data frames, wherein the write storage-request packet frame message specifies the total amount of data being written, and includes a connect Start of Frame (SOF) delimiter and addressing parameters for the following data frames, and wherein the data frames are transmitted over the circuit-switched path set up by the storage-request packet frame and do not include a link-header, and the last frame includes a disconnect SOF delimiter.

11. A method of superimposing a dynamic switch protocol on a token bus protocol in a shared medium network as in claim 1, including, in a write data sequence, utilizing an acknowledge sequence returned in either a non-interlocked mode or an interlocked mode to confirm successful processing of data and storage in a data buffer in the destination node, and in an interlocked mode including, in the last data frame, a passive Start of Frame (SOF) delimiter, and utilizing an acknowledge response with a disconnect SOF delimiter which terminates the circuit switched path.

12. A method of superimposing a dynamic switch protocol on a token bus protocol in a shared medium network as in claim 1, including in a storage-read operation, beginning the data transmission with a non-interlocked read-request storage-request packet from the sender not to the destination node, and the destination node when it acquires the token returns the storage-request packet and the data.

* * * * *

UNITED STATES PATENT AND TRADEMARK OFFICE
CERTIFICATE OF CORRECTION

PATENT NO. : 5,235,592
DATED : August 10, 1993
INVENTOR(S) : Ting D. Cheng, et al.

Page 1 of 2

It is certified that error appears in the above-indentified patent and that said Letters Patent is hereby corrected as shown below:

Column 4, line 44: after "Fig 3B;" delete "and"

Column 8, line 49: "correct" should read as --connect--

Column 8, line 64: "pot" should read as --port--

Column 10, line 52: "busy.+" should read as --"busy."--

Column 11, line 49, Claim 1: "for" should read as --of--

Column 12, line 29, Claim 3: "or" should read as --of--

Column 12, line 44, Claim 5: "toke" should read as --token--

UNITED STATES PATENT AND TRADEMARK OFFICE
CERTIFICATE OF CORRECTION

PATENT NO. : 5,235,592
DATED : August 10, 1993
INVENTOR(S) : Ting D. Cheng, et al It is certified that error appears in the above-indentified patent and that said Letters Patent is hereby corrected as shown below:

Column 14, lines 4-5 claim 10, "frame message" should read
--message frame--

Signed and Sealed this

Twenty-second Day of March, 1994

Attest:

BRUCE LEHMAN

Attesting Officer    Commissioner of Patents and Trademarks